United States Patent
Ros-Giralt

(10) Patent No.: US 11,106,493 B2
(45) Date of Patent: Aug. 31, 2021

(54) SYSTEMS AND METHODS FOR MULTIRESOLUTION PRIORITY QUEUES

(71) Applicant: Reservoir Labs, Inc., New York, NY (US)

(72) Inventor: Jordi Ros-Giralt, Newport Beach, CA (US)

(73) Assignee: Reservoir Labs, Inc., New York, NY (US)

( * ) Notice: Subject to any disclaimer, the term of this patent is extended or adjusted under 35 U.S.C. 154(b) by 211 days.

(21) Appl. No.: 15/993,036

(22) Filed: May 30, 2018

(65) Prior Publication Data

US 2019/0065247 A1    Feb. 28, 2019

Related U.S. Application Data

(60) Provisional application No. 62/512,438, filed on May 30, 2017.

(51) Int. Cl.
| | |
|---|---|
| *G06F 9/46* | (2006.01) |
| *G06F 9/48* | (2006.01) |
| *G06F 9/50* | (2006.01) |
| *G06F 16/901* | (2019.01) |
| *G06F 16/245* | (2019.01) |

(52) U.S. Cl.
CPC .......... *G06F 9/4881* (2013.01); *G06F 9/5038* (2013.01); *G06F 16/245* (2019.01); *G06F 16/9017* (2019.01)

(58) Field of Classification Search
CPC ... G06F 9/4881; G06F 16/9017; G06F 9/5038
See application file for complete search history.

(56) References Cited

U.S. PATENT DOCUMENTS

| | | | | |
|---|---|---|---|---|
| 5,619,500 A | * | 4/1997 | Hiekali | H04Q 11/0478 370/396 |
| 2002/0133530 A1 | * | 9/2002 | Koning | G06F 9/52 718/102 |

OTHER PUBLICATIONS

B.H. Bloom, "Space/Time Trade-offs in Hash Coding with Allowable Erors", Commun. ACM, 1970, vol. 13, No. 7, pp. 422-426.
R. Brown, "Calendar queues: a fast 0(1) priority queue implemetation for the simulation eventset problem," Common. ACM, 1988, vol. 31, No. 10, pp. 1220-1227.
B. Chazelle, "The Soft Heap: An Approximate Priority Queue with Optimal Error Rate, " J ACM. 2000, vol. 47, No. 6, pp. 1012-1027.
B. Chazelle, "A minimum Spanning Tree Algorithm wiht Inverse Ackermann Type Complexity," J. ACM, 2000, vol. 47, No. 6, pp. 1028-1047.
Cormode andMuthukrishnan, "An improved data stream summary: the count-min sketch and its applications," J. Algorithm., Comput. Technol., 2005, vol. 55, No. 1. pp. 58-75.

(Continued)

*Primary Examiner* — Wissam Rashid
(74) *Attorney, Agent, or Firm* — Goodwin Procter LLP

(57) ABSTRACT

A system for storing and extracting elements according to their priority takes into account not only the priorities of the elements but also three additional parameters, namely, a priority resolution $p_\Delta$ and two priority limits $p_{min}$ and $p_{max}$. By allowing an ordering error if the difference in the priorities of elements are within the priority resolution, an improvement in performance is achieved.

30 Claims, 8 Drawing Sheets

(56) References Cited

OTHER PUBLICATIONS

E. W. Dijkstra, "A note on two problems in connnexion iwht graphs," Numer., Math., 1959, vol. 1, No. 1, 99. 269-271.
M. L. Fredmann and R. E. Tarjan, "Fibonacci Heaps and Their Uses in Improved Network Optimization Aldorithmd," in 25th Annual Symposium on Foundations of Computer Science, 1984, pp. 596-615.
J. Ros-Giralt, et al., "Multiresolution Prioriry Queues and Applications," presented at IEEE High Performance Extreme Computing Conference, Boston, USA, pp. 1-10.
J. Ros-Giralt, et al., "Lockless hash tables with low false negatives," 2014 IEEE High Performance Extreme Computing Conference (HPEC), pp. 1-6.
J. Ros-Giralt, et al., "High-performance many-core networkimg design an implementatoni," in Proceedings of the Seccond Workshop on innovating the Network for Data-Intensive Science— INDIS 15, Austin, Texas, 2015, pp. 1-7.
K. Melhorn and P. Sanders, "Algorithm and Data Structures: The Basic Toolbox." Springer Science & Business Media, 2008, 156 pages.
Paxon, "Bro: a system for detecting network intruders in real-time," Computer Networks, 1999, vol. 3, No. 23-24, pp. 2435-2463.
Lange J.R., Dinda P.A., Bustamante F.E. (2007) Vortex: Enabling Cooperative Selective Wormholing for Network Security Systems. In: Kruegel C., Lippmann R., Clark A. (eds) Recent Advances in Intrusion Detection. RAID 2007. Lecture Notes in Computer Scienve, vol. 4637. Springer, Berlin, Heidelberg.

\* cited by examiner

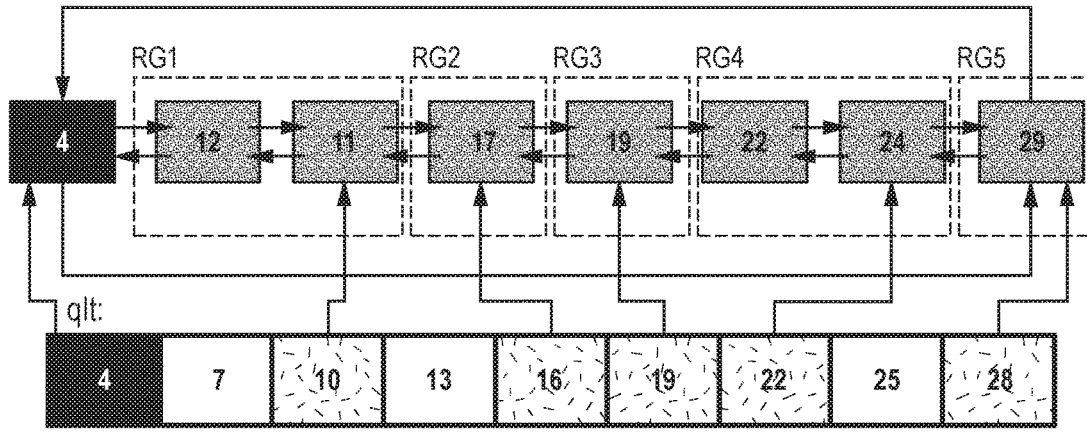

FIG. 1A

| "e" | "slot" | "slot_iter" | Action | qlt[slot] | | |
|---|---|---|---|---|---|---|
| | | Input Sequence: 19, 11, 17, 12, 24, 22 and 29 | | | | |
| 19 | (19-4) / 3 = 5 | 5, decrement to 0 | Add 19 to right of sentinel 4 | qlt[5] = 19 | | |
| 11 | (11-4) / 3 = 2 | 2, decrement to 0 | Add 11 to right of sentinel 4 | qlt[2] = 11 | | |
| 17 | (17-4) / 3 = 4 | 4, decrement to 2 | Add 17 to right of "11" | qlt[4] = 17 | | |
| 12 | (12-4) / 3 = 2 | 2, no decrement | Add 12 to left of 11 | qlt[2] = 11 (remains 11) | | |
| 24 | (24-4) / 3 = 6 | 6, decrement to 5 | Add 24 to right of 19 | qlt[6] = 24 | | |
| 22 | (22-4) / 3 = 6 | 6, no decrement | Add 22 to left of 24 | qlt[6] = 24 (remains 24) | | |
| 29 | (29-4) / 3 = 8 | 8, decrement to 6 | Add 29 to right of 24 | qlt[8] = 29 | | |
| At this point, qlt[1] = qlt[3] = [qlt[7] = NULL | | | | | | |

FIG. 1B

Total: 63724 samples
    4139  6.5% PriorityQueue::ExtractMin
    2500  3.9% SLL_Pop
    1899  3.0% Ref
    1829  2.9% Unref
    1701  2.7% PackedCache::KeyMatch
    1537  2.4% Attributes::FindAttr
    1249  2.0% Dictionary::Lookup
    1184  1.9% NameExpr::Eval

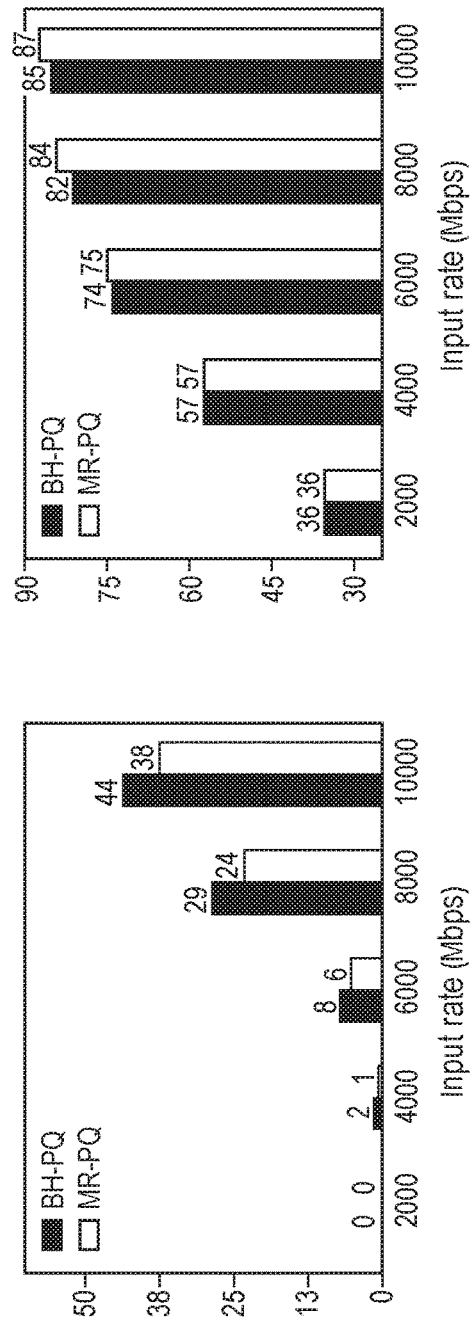
FIG. 7

SYSTEMS AND METHODS FOR MULTIRESOLUTION PRIORITY QUEUES

CROSS REFERENCE TO RELATED APPLICATIONS

This application claims benefit of priority to U.S. Provisional Patent Application Ser. No. 62/512,438 entitled "Systems and Methods for Multiresolution Priority Queues," filed on May 30, 2017, the entire contents of which are incorporated herein by reference.

FIELD OF THE INVENTION

This disclosure generally relates to high-performance scheduling systems and methods, and in particular, to systems that facilitate scheduling of tasks for execution and/or processing of data elements, where the schedule is represented as a queue according to task or data-element priorities at a customizable level of granularity.

BACKGROUND

Priority queues are a type of container data structures designed to guarantee that the element at the front of the queue is the greatest of all the elements it contains, according to an ordering defined by the priorities of the elements. In this context, "greatest" does not mean the largest number or quantity. Rather, greatest means the highest priority. In a max-queue, the highest priority is represented by the largest number or an alphanumerical value. In contrast, in a min-queue, the highest priority is represented by the smallest number or an alphanumerical value. The ordering in a priority queue allows for elements of higher priority to be extracted first, independently of the order in which they are received and inserted into the queue.

Fast implementations of priority queues are important to many high performance computing (HPC) applications and hence optimizing their performance has been the subject of intense research. For example, in graph searching, the algorithmic complexity of essential algorithms such as finding the shortest path between two nodes in a graph relies entirely on the performance of a priority queue. Other essential applications are found in the field of bandwidth management. For instance, in the Internet, routers often have insufficient capacity to transmit all packets at line rate and so they use priority queues in order to assign higher preference to those packets that are most critical in preserving the quality of experience (QoE) of the network (e.g., packets carrying delay sensitive data such as voice). Priority queues are also important in other areas including Huffman compression codes, operating systems, Bayesian spam filtering, discrete optimization, simulation of colliding particles, or artificial intelligence to name some examples.

Priority queues have been the subject of intense research since J. W. Williams introduced the binary heap data structure and the heapsort algorithm in 1964. Using complexity analysis, Williams' work lead to a very efficient implementation with a worst case cost to insert and extract elements from the priority queue of O(log(n)), where n is the number of elements in the queue. In many applications, this has been a way to implement priority queues due to its simplicity and good performance. Variations exist that can achieve better performance on some operations at the expense of adding more implementation complexity, such as Fibonacci heaps, which have an amortized cost of inserting and removing an element of O(1) and O(log(n)), respectively.

Soft heaps can achieve a constant amortized cost by introducing a certain amount of error. Specifically, a soft heap can break the information-theoretic barriers of the problem by introducing error in the key space in a way that the problem's entropy is reduced. While soft heaps provide the most asymptotically efficient known algorithm for finding minimum spanning trees, their applications are limited in that they cannot guarantee an upper bound error on the number of elements in the queue because, depending on the sequence of insertions and extractions, all keys could be corrupted in a soft heap.

Some other priority queues described in the literature include bucket queues and calendar queues. When the set of priorities are integers and bounded to C, a bucket queue can insert and extract elements in O(1) and O(C), respectively. The resolution of a bucket queue data structure cannot be tuned, however, and it does not support the general case of priorities in the set of real numbers $\mathbb{R}$. A calendar queue provides O(1) complexity for both insert and remove operations. To achieve these bounds, the queue needs to be balanced. Additionally, like the bucket queue a calendar queue does not support changing the resolution of the priority set.

SUMMARY

In various embodiments, a multi-resolution priority queuing technique described herein can improve the performance of a priority queue by introducing a trade-off to exploit an existing gap between the applications' requirements and the set of priorities supported by a priority queue. The result is a new system and method called multiresolution priority queue which can flexibly trade off a controllable amount of resolution error in the space of priorities in exchange for achieving greater performance.

Rather than introducing an error in the key space as in other techniques, various embodiments described herein can break the information-theoretic barriers of the problem by exploiting the multiresolution properties of the priority space. Since in many problems the entropy of the priority space is lower than the entropy of the key space, the end result is a peculiar container data structure with a lower computational complexity. In particular, a multi-resolutive priority space according to various embodiments can have a constant entropy independent of the number of elements in the queue, and this result leads to O(1) computational complexity bound of various embodiments described herein, which can increase the performance of forming a priority queue by 2% 5%, 10%, 15% or even more, compared to implementations based on other techniques.

A simple example is as follows. Suppose that we use a priority queue to hold jobs $\{job_1, job_2, \ldots, job_n\}$ which need to be scheduled using a "shortest job first" policy. Each job $job_i$ takes a certain time to process, denoted by $p_i$, and the removal of an element from the queue returns the job with the smallest processing time $\min\{p_i\}$. As such, $p_i$ determines the priority of each job. A common approach is to use a binary heap based implementation of a priority queue, which can effectively provide support for all possible range of priorities $p_i$ in the space of real numbers $\mathbb{R}$. Assume now that the set of possible priority values $p_i$ is discretized into l subsets and that the application only requires guaranteeing the ordering between elements belonging to different subsets. A multiresolution priority queue is a data structure that can provide better performance than a standard priority queue by supporting the coarser grained resolution space having l subsets rather than the complete set of priorities. Put differently, in various embodiments of the multi-resolution priority queuing technique, the total ordering requirement imposed on the set of priorities is relaxed, allowing for elements in the queue to be only partially ordered. The error introduced by such partial ordering is bounded, and the performance can be improved by a factor of log(n), where n is the number of tasks to be executed or elements to be processed, because the computational complexity of various embodiments of the multi-resolution priority queue is O(1).

Accordingly, in one aspect a method is provided for queuing elements for processing thereof according to element priorities. The method includes the steps of: (a) determining a first priority group corresponding to a first new element that is to be queued. In general, the priorities associated with the elements range from a highest priority to a lowest priority. These priorities may be grouped into two or more groups. Each element then corresponds to a particular priority group. The method also includes: (b) determining a first slot in a look-up table that includes several slots. At least one slot in the look-up table includes a queue pointer, and the first slot corresponds to the first priority group. In the context of locking of slots that is discussed below, the first slot may be referred to as slot1.

In addition, the method includes step (c) where, if the first slot is not empty: (1) a first queued element corresponding to the first slot is selected, and (2) the first new element is queued in a queue immediately before the first queued element. The method also includes step (d), which is performed if step (c) is not performed. Step (d) includes (1) selecting from a first set of slots that are in the look-up table and that are associated with a set of priority groups each having a priority higher than the priority group corresponding to the first new element, a second slot that is not empty and that is associated with a lowest priority group in the first set of slots. In the context of locking of slots that is discussed below, the second slot may be referred to as slot2. In general, the second slot corresponds to a priority group having the lowest priority among all priority groups having a higher priority than that corresponding to the first priority group. Step (d) also includes (2) selecting a second queued element, i.e., an element that is already queued, that corresponds to the second slot, and (3) queuing in the queue the first new element immediately after the second queued element. Moreover, Step (d) includes (4) storing in the first slot a pointer to a memory location in the queue of the first new element.

In some embodiments, the several slots in the look-up able may be configured as an array or a binary tree. Each slot may correspond to a respective priority group, and each non-empty slot may hold a respective pointer to a respective element in the queue, where the respective element has a priority that belongs to the respective priority group.

In some embodiments, the several slots are associated with a highest global priority, and the method includes decreasing the highest global priority. For example, in the context of a min-priority queue, decreasing the highest global priority means increasing the designated priority value of the highest global priority. The method may also include determining a number of slots to be shifted, by identifying one or more slots, each of which has a priority associated therewith that is higher than the decreased highest global priority. The method may also include determining if an index k of a candidate slot is less than a difference between a total number of slots in the look-up table and the number of slots to be shifted. If this condition is determined to be true, the method includes storing in the candidate slot having the index k a pointer stored in another slot having an index k+ the number of slots to be shifted. Otherwise, the method may include storing in the candidate slot having the index k a NULL pointer. Decreasing the highest global priority may include increasing a value indicative of priority. Thus, the queue may be described as a min queue. Alternatively, decreasing the highest global priority may include decreasing a value indicative of priority. Thus, the queue may be described as a max queue.

In some other embodiments in which priorities may be shifted, the look-up table is configured as a ring structure. Determining the first slot in the look-up table may therefore include computing a modulus using a slot size of the look-up table. Several slots may be associated with a highest global priority, and the method may include decreasing the highest global priority and determining a number of slots to be shifted by identifying one or more slots, each of which has a priority associated therewith that is higher than the decreased highest global priority. The queue includes a sentinel that indicates an element associated with the highest global priority. The method may include incrementing the sentinel to a slot location obtained by adding the number of slots to a current slot location of the sentinel, and by obtaining a modulus of the addition using the slot size of the look-up table.

In some embodiments, the resolution of different slots groups can be different. In these embodiments, the look-up table includes a number of slot sets including a first slot set and a second slot set. A first resolution is associated with the first slot set, where the first resolution is based on a ratio of: (a) a difference between highest and lowest priorities associated with the first slot set and (b) a number of slots in the first slot set. A second resolution is associated with the second slot set, where the second resolution includes a ratio of: (a) a difference between highest and lowest priorities associated with the second slot set and (b) a number of slots in the second slot set. The second resolution is typically different from the first resolution.

In general, two or more element insert operations, two or more element extract operations, and a combination of one or more element insert and one or more element extract operations may be performed concurrently. Concurrent in this context means at least a part of the processing of the elements overlaps in time. The concurrent operations are permitted if they would not corrupt the queue, and whether two concurrent operations would corrupt a queue is determined using locksets.

As such, the method may include determining a lockset associated with a specified element. To this end, the method may include determining a priority group corresponding to the specified element, and determining a first candidate lock slot, referred to as slot1, in the look-up table. The first candidate lock slot may correspond to the priority group corresponding to the specified element. The method also includes selecting from a first candidate set of slots that are in the look-up table and that are associated with a set of priority groups each having a priority higher than the priority group corresponding to the specified element, a second candidate lock slot that is not empty and that is associated with a lowest priority in the first candidate set of slots. The second candidate slot may be referred to as slot2. The second candidate slot is associated with a priority group having the lowest priority among all of the priority groups having higher priorities than the priority of the priority group corresponding to the specified element. The method includes locking the second candidate lock slot.

In addition, the method include determining if the first candidate lock slot is not empty and, if it is so determined, locking the first candidate lock slot. Thus, the lockset would include slots: slot1 and slot2. Otherwise, the method includes selecting from a second candidate set of slots in the look-up table that are associated with a set of priority groups each having a priority lower than the priority group corresponding to the specified element, a third candidate lock slot that is not empty and that is associated with a highest priority group in the second candidate set of slots. The third candidate slot may be referred to as slot3. The third candidate slot is associated with a priority group having the highest priority among all of the priority groups having lower priorities than the priority of the priority group corresponding to the specified element. If the first candidate lock slot is determined to be empty, the method includes locking the third candidate lock slot. The lockset would then include slots: slot2 and slot3.

In some embodiments, the method allows concurrent insertion of two or more elements if their respective locksets do not conflict, i.e., do not include the same slots. To this end, the method includes determining a first lockset of slots in the look-up table that are to be locked and that correspond to the first new element that is to be queued. This determination may be made by setting the first new element as the specified element for which is lockset can be determined as described above. The method may also include determining a second lockset of slots in the look-up table that are to be locked and correspond to a second new element that is to be queued, by setting the second new element as the specified element. Moreover, the method may allow concurrently initiating one or more of steps (c)(1)-(2) or (d)(2)-(4) for both the first and second new elements when the first and second locksets do not overlap, i.e., when the two locksets do not include the same slot or slots.

In some embodiments, the method allows concurrent insertion of one element and extraction of another element. To this end, the method includes determining a first lockset of slots in the look-up table that are to be locked and correspond to the first new element that is to be queued, by setting the first new element as the specified element. The method also includes determining a second lockset of slots in the look-up table that are to be locked and correspond to an element to be extracted, by setting the element to be extracted as the specified element. In addition, the method includes concurrently initiating extraction of the element to be extracted and one or more of steps (c)(1)-(2) or (d)(2)-(4) for the first new element, when the first and second locksets do not overlap.

In some embodiments, the method allows concurrent extraction of two or more elements. To this end, the method includes determining a first lockset of slots in the look-up table that are to be locked and correspond to a first element to be extracted, by setting the first element to be extracted as the specified element. The method also includes determining a second lockset of slots in the look-up table that are to be locked and correspond to a second element to be extracted, by setting the second element to be extracted as the specified element. Furthermore, the method includes concurrently initiating extraction of the first and second elements to be extracted when the first and second locksets do not overlap.

In some embodiments, the method includes extracting a specified element that is to be extracted by: (e) determining a priority group corresponding to the specified element, and (f) determining an extraction slot in the look-up table that corresponds to the priority group corresponding to the specified element. In addition, the method includes (g) determining that the extraction slot contains a pointer to the specified element. The method also includes determining (h) if a previous element associated with the specified element belongs to the priority group corresponding to the specified element. If it is so determined, the method includes storing in the extraction slot a pointer to a memory location in the queue of the previous element, and otherwise storing in the extraction slot a NULL pointer. The method may also include setting a next element of a sentinel element in the queue as the specified element that is to be extracted, so that an element belonging to the highest priority group is extracted.

In some embodiments, the method includes extracting one or more elements from the queue. The element may be a task to be executed or a data element to be processed. As such, the one or more elements are extracted for execution or processing thereof, by a specialized computer selected from the group consisting of: a parallel computer comprising a plurality of processors, a distributed computer, and an event-driven computer.

In another aspect, a system is provided for queuing elements for processing thereof according to element priorities. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both. The instructions in the first memory program the processing unit to: (a) determine a first priority group corresponding to a first new element that is to be queued, and (b) determine a first slot in a look-up table that includes several slots. At least one slot in the look-up table includes a queue pointer, and the first slot corresponds to the first priority group.

In addition, the instructions program the processing unit to (c) determine if the first slot is not empty and, if so determined, to: (1) select a first queued element corresponding to the first slot, and (2) queue the first new element in a queue immediately before the first queued element. Otherwise, the instructions program the processing unit to: (d)(1) select from a first set of slots that are in the look-up table and that are associated with a set of priority groups each having a priority higher than the priority group corresponding to the first new element, a second slot that is not empty and that is associated with a lowest priority group in the first set of slots; (2) select a second queued element, i.e., an element that is already queued, that corresponds to the second slot; (3) queue in the queue the first new element immediately after the second queued element; and (4) store in the first slot a pointer to a memory location in the queue of the first new element. In various embodiments, the instructions can program the processing unit to perform one or more of the method steps described above.

In another aspect, an article of manufacture is provided for queuing elements for processing thereof according to element priorities. The article of manufacture includes a non-transitory storage medium having stored therein instructions which, when executed by a processing unit program the processing unit, which is in electronic communication with a memory module, to: (a) determine a first priority group corresponding to a first new element that is to be queued, and (b) determine a first slot in a look-up table that includes several slots. At least one slot in the look-up table includes a queue pointer, and the first slot corresponds to the first priority group.

In addition, the instructions program the processing unit to (c) determine if the first slot is not empty and, if so determined, to: (1) select a first queued element corresponding to the first slot, and (2) queue the first new element in a queue immediately before the first queued element. Otherwise, the instructions program the processing unit to: (d)(1) select from a first set of slots that are in the look-up table and that are associated with a set of priority groups each having a priority higher than the priority group corresponding to the first new element, a second slot that is not empty and that is associated with a lowest priority group in the first set of slots; (2) select a second queued element, i.e., an element that is already queued, that corresponds to the second slot; (3) queue in the queue the first new element immediately after the second queued element; and (4) store in the first slot a pointer to a memory location in the queue of the first new element. In various embodiments, the instructions can program the processing unit to perform one or more of the method steps described above.

BRIEF DESCRIPTION OF THE DRAWINGS

In the following description, various embodiments of the present invention are described with reference to the following drawings, in which:

FIG. 1A depicts the state of a multiresolution priority queue according to one embodiment, after inserting elements with priorities 19, 11, 17, 12, 24, 22 and 29 (in this order);

FIG. 1B depicts the key parameters of the multiresolution priority queue illustrated in FIG. 1A, after the insertion of each new element;

FIG. 7 illustrates performance improvement in an event-driven simulator, based on four different system wide metrics when using a multiresolution priority queue and compared with a binary heap priority queue;

DETAILED DESCRIPTION

Multiresolution Priority Queue: Theory of Operation

Figure 2:
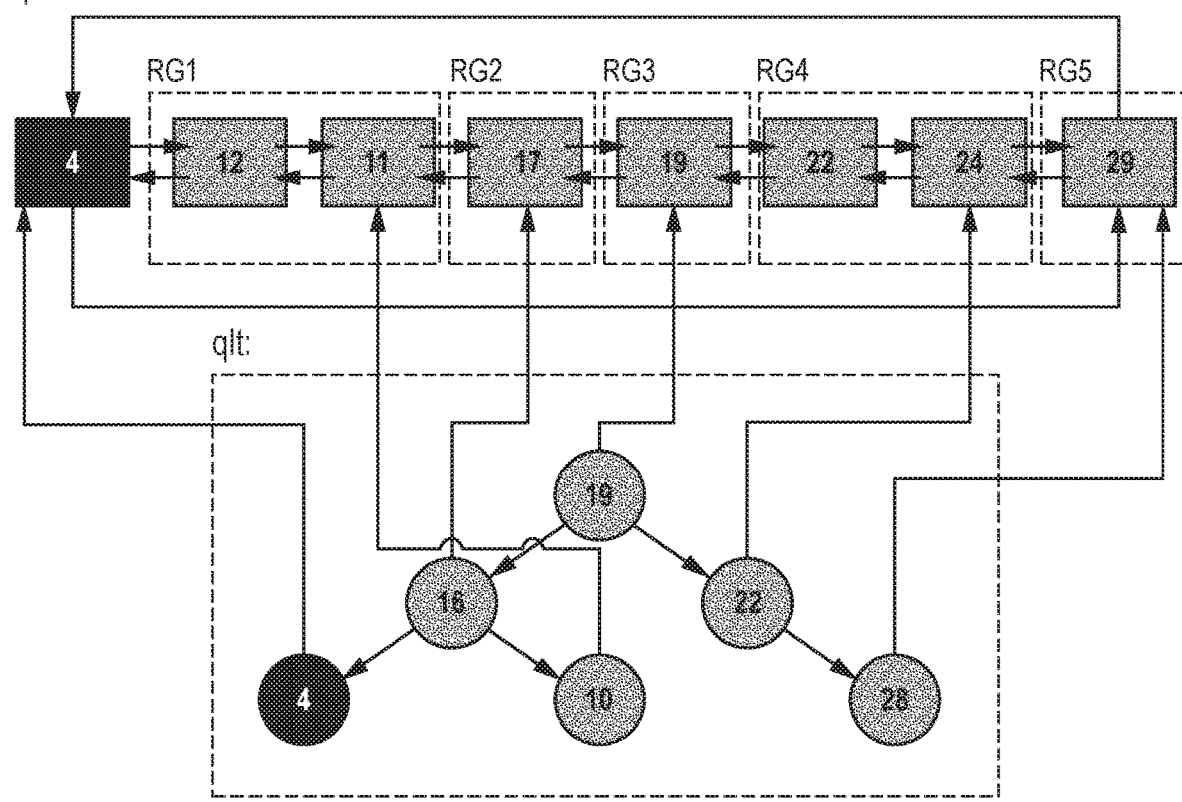
FIG. 2 depicts another embodiment of an MR-PQ shown in FIG. 1, where a binary tree is used to implement the qlt table.

A multiresolution priority queue (MR-PQ) is a container data structure that can retrieve its elements (e.g., tasks to be executed, data elements to be processed, etc.) based on their priority and according to three parameters: a priority resolution $p_\Delta$ and two priority limits $p_{min}$ and $p_{max}$. The priority limits are chosen such that $p_{max} > p_{min}$ and $(p_{max} - p_{min})$ is divisible by $p_\Delta$ or where $p_\Delta < (p_{max} - p_{min})$. In general, a traditional priority queue guarantees that for any two elements $e_a$ and $e_b$ having priorities $p_a$ and $p_b$, respectively, where $p_a > p_b$, element $e_a$ is placed ahead of element $e_b$ in the queue, regardless of the difference between $p_a$ and $p_b$. In this context, "placed ahead" means the processing or execution of element $e_a$ does not start before the processing or execution of element $e_b$. Put differently, element $e_b$ is not dequeued (i.e., removed or extracted from the queue) before element $e_a$ is dequeued.

Unlike traditional priority queues, multiresolution priority queues according to various embodiments do not guarantee such total order of elements. Rather, for elements $e_a$ and $e_b$, within a certain priority resolution $p_\Delta \geq (p_a - p_b)$, element $e_b$ may be placed ahead of element $e_a$ in the queue even though $p_a > p_b$. By trading off a small resolution, multi-resolution queues according to various embodiments can achieve higher performance. In particular, because many real world applications do not require priority queues to support infinite resolution spaces, in many of these cases MR-PQs can be used to achieve greater performance at no cost, as we will show.

More formally, an MR-PQ is a queue that at all times maintains the following invariant: Property 1. Multiresolution Priority Queue (MR-PQ) Invariant. Let $e_i$ and $e_j$ be two arbitrary elements with priorities $p_i$ and $p_j$, respectively, where $p_{min} \leq p_i \leq p_{max}$ and $p_{min} \leq p_j \leq p_{max}$. Then for all possible states, a multiresolution priority queue ensures that element $e_i$ is dequeued before element $e_j$ if the following condition is true:

$$\lfloor (p_i - p_{min})/p_\Delta \rfloor < \lfloor (p_j - p_{min})/p_\Delta \rfloor \quad (1)$$

Thus, an MR-PQ discretizes the priority space into a sequence of slots or resolution groups $[p_{min}, p_{min} + p_\Delta)$, $[p_{min} + p_\Delta, p_{min} + 2 \cdot p_\Delta)$, ..., $[p_{max} - p_\Delta, p_{max})$ and prioritizes elements according to the slot in which they belong. Those elements belonging to lower slots are given higher priority, while those in the same slot are given the same priority. Within a slot, a multiresolution priority queue does not guarantee the priority ordering of its elements, which enables a mechanism to control the tradeoff between the resolution of the priority set and the performance of the queue. As we will see, the larger the resolution parameter $p_\Delta$, the higher the performance of the queue, at the expense of making the priority space more granular. In the limit where the priority resolution becomes infinitely small, $p_\Delta \to 0$, an MR-PQ degenerates to a standard priority queue in which the invariant in Property 1 is satisfied for arbitrarily small priority slots, hence achieving infinite resolution.

Notice that in our chosen notation and without loss of generality, elements with relatively smaller values of priority are treated as higher priority. This is also commonly known in the literature as a min-priority queue. This choice is for convenience only. The techniques described herein are equally applicable to max-queues, where elements having relatively larger values of priority are treated as higher priority. Well-known examples of applications using min-priority queues include event-driven computation systems and shortest path based routing systems, among many others. The performance of such systems can be improved by implementing the queue structures therein as a multi-resolution queue, according to various embodiments described herein.

A multiresolution priority queue (MR-PQ) includes two specialized data structures: a queue (queue) and a queue lookup table (qlt). The queue may be implemented as a doubly linked list of elements, while the lookup table may be implemented as a one dimensional array of pointers to the queue elements. Elements stored in the doubly linked list have a next pointer (next) and a previous pointer (prev).

They also include a third field which is a number representing their respective priorities (prio).

Let pmin, pmax, and pdelta be three parameters initialized to $p_{min}$, $p_{max}$ and $p_\Delta$, respectively. Then the following instructions are used to build an empty MR-PQ:

---
Build(q)
---
```
1  sentinel = alloc_element( );
2  queue = sentinel;
3  queue->next = queue;
4  queue->prev = queue;
5  qltsize = (pmax-pmin)/pdelta + 1;
6  for i in [1, qltsize):
7     qlt[i] = NULL;
8  qlt[0] = queue;
9  queue->prio = pmin - pdelta;
```
---

The queue object is implemented as an element acting as its sentinel (lines 1 and 2). Lines 3 and 4 set the queue to empty. The lookup table qlt is implemented as a vector of pointers to elements in the queue with as many entries as the number of resolution slots $(p_{max}-p_{min})/p_\Delta$ plus one to accommodate for the queue's sentinel. In its initial state, all of its elements are set to NULL (since the queue is empty) except for the first element, which is permanently set to the sentinel (lines 6, 7 and 8). In line 9, the sentinel is given a fictitious priority of $p_{min}-p_\Delta$, to ensure that no other element can have a lower priority value (i.e., a higher priority in a min-queue) than that of the sentinel. Serving the role of guarding the queue, the sentinel is never removed.

In some embodiments, to insert an element e, the base MR-PQ algorithm executes the following instructions:

---
Insert(e)
---
```
10  slot = slot_iter = QLTSLOT(e);
11  while qlt[slot_iter] == NULL:
12     slot_iter--;
13  if slot_iter == slot: // Add to the left
14     e->next = qlt[slot];
15     e->prev = qlt[slot]->prev;
16     qlt[slot]->prev->next = e;
17     qlt[slot]->prev = e;
18  else: // Add to the right
19     e->next = qlt[slot_iter]->next;
20     e->prev = qlt[slot_iter];
21     qlt[slot_iter]->next->prev = e;
22     qlt[slot_iter]->next = e;
23     qlt[slot] = e;
```
---

In some embodiments, the invocation of Q<sub>LT</sub>S<sub>LOT</sub>(e) in line 10 calculates an index to the qlt table associated with element e as follows:

---
QltSlot(e)
---
```
24  slot = (int)((e->prio - queue->prio)/pdelta);
25  return slot;
```
---

After computing the slot of element e in line 10, a search is performed on the qlt table for a non-empty slot slot_iter starting from index slot and decrementing the index at each iteration (lines 11 and 12). Notice that because qlt[0] is permanently set to the queue's sentinel, this operation is guaranteed to complete.

Specifically, if all elements of the look-up table starting from the initial index (represented by the value of slot) down to index 1 are NULL, slot_iter will decrement to index 0, where it will find the sentinel. If the slot_iter found is same as slot, it means there is already one or more elements stored in e's slot. In this case, we doubly-link e to the left of the first element found in the slot qlt[slot] (lines 14 through 17). If instead e's slot is empty, then we doubly-link e to the right of the element found in the first non-empty slot qlt[slot_iter] (lines 19 through 22) and set qlt[slot] to point to e (line 23). Here, the first non-empty slot that is found is associated with a set of elements that all have priorities greater than the priority of element "e." Moreover, the non-empty slot is associated with a priority group that has the lowest priority within the priority groups that are associated with the set of elements described above.

This ordering strategy is crucial to ensure that the MR-PQ invariant (Property 1) is preserved at all times, as we will formally demonstrate below. In general, the insertion of an element in the MR-PQ data structure includes building a list of elements that are doubly linked in a way that the insertion maintains a correct priority ordering according to the resolution parameter $p_\Delta$.

As an example, let a multiresolution priority queue have parameters $p_\Delta=3$, $p_{min}=7$ and $p_{max}=31$, and assume we insert seven elements with priorities 19, 11, 17, 12, 24, 22 and 29 (inserted in this order). FIG. 1A depicts the state of the MR-PQ after inserting all of these elements. FIG. 1B shows the different steps of the seven insertions and the state of certain key parameters. Notice that while elements belonging to different slots (referred in FIG. 1A as resolution groups RG1 through RG5) are guaranteed to be served according to their priority (e.g., the elements with priorities 12 and 11 are served before the element with priority 17), the queue does not guarantee the ordering of elements that belong to the same slot (e.g., the element with priority 12 is served before the element with priority 11). Recall, this is a min-queue so the element having a priority value 11 has higher priority than element having a priority value 12.

The operation to peek (without removing) the top priority element from the queue includes retrieving the first element in the queue after the sentinel, if any such element exists, as follows:

---
Peek( )
---
```
26  e = queue->next;
27  if e == q:
28     return NULL; // Queue is empty
29  return e;
```
---

To extract an arbitrary element from the queue, we unlink it (lines 30 and 31) and invoke Q<sub>LT</sub>R<sub>EPAIR</sub> to repair the lookup table (line 32):

---
Extract(e)
---
```
30  e->prev->next = e->next;
31  e->next->prev = e->prev;
32  QLTREPAIR(e);
33  return e;
```
---

If element e is not pointed to by any of the lookup table entries, then there is nothing to repair (lines 35 and 36). Otherwise, if e→prev is in the same slot as e (line 37), then we set qlt[slot] to point to e→prev (line 38) to ensure the slot is pointing to the rightmost element of its resolution group. If instead e→prev is not in the same slot as e, then the slot has become empty and we set qlt[slot] to NULL (line 40).

| QltRepair(e) |
| --- |
| 34 slot = QLTSLOT(e);<br>35 if qlt[slot] != e:<br>36   return; // Nothing to fix<br>37 if slot == QLTSLOT(e->prev):<br>38   qlt[slot] = e->prev; // Fix the slot<br>39 else:<br>40   qlt[slot] = NULL; // No elements left in slot |

Now the operation to extract the highest priority element from the queue can be performed with a PEEK( ) followed by a EXTRACT(e):

| ExtractMin( ) |
| --- |
| 41 e = PEEK( );<br>42 EXTRACT(e);<br>43 return e; |

Correctness and Complexity

In what follows, we prove the correctness of the different embodiments of the multi-resolution queuing technique by demonstrating that the Insert and Remove routines preserve the MR-PQ invariant (Property 1). Notice first that the PEEK and the EXTRACTMIN routines select elements from the queue by using the sentinel's next pointer (line 26) and therefore it suffices to show that Equation (1) is preserved for any two consecutive elements $e_i$ and $e_j$ such that $(e_i \to next)=e_j$. Next, we will assume that the queue is in a state in which the MR-PQ invariant is true and demonstrate that after the INSERT or the EXTRACT routines the queue continues to preserve the invariant.

Assume that we invoke the Insert routine on element $e_i$. There are two cases: qlt[QltSlot($e_i$)] is not NULL or qlt[QltSlot($e_i$)] is NULL. Assume the first case, where lines 14 through 17 insert element $e_i$ between two elements $e_j$ and $e_k$ such that $(e_j \to next)=e_i=(e_k \to prev)$. After the insertion, the following is true:

QltSlot($e_j$)=QltSlot($e_i$) or QltSlot($e_j$)<QltSlot($e_i$), in which case the invariant is preserved for elements $e_i$ and $e_j$.

QltSlot($e_k$)=QltSlot($e_i$), which implies that the invariant is also preserved for elements $e_i$ and $e_k$.

Assume now that qlt[QltSlot($e_i$)] is NULL, where lines 19 through 22 insert element $e_i$ between two elements $e_j$ and $e_k$ such that $(e_j \to next)=e_i=(e_k \to prev)$. After the insertion, the following is true:

QltSlot($e_j$)<QltSlot($e_i$), in which case the invariant is preserved for elements $e_i$ and $e_j$.

QltSlot($e_k$)>QltSlot($e_i$), and hence the invariant is also preserved for elements $e_i$ and $e_k$.

Assume now that we invoke the EXTRACT routine on element $e_i$, and let $e_j$ and $e_k$ be the elements before and after $e_i$ in the queue, respectively. There are three possible cases:

Case 1: qlt[QltSlot($e_i$)]≠$e_i$(lines 35 and 36). In this case we have that QltSlot($e_j$)≤QltSlot($e_i$) and QltSlot($e_k$)=QltSlot($e_i$). Hence after extracting $e_i$ we have QltSlot($e_j$)≤QltSlot($e_k$) and the invariant is preserved.

Case 2: qlt[QltSlot($e_i$)]=$e_i$ and QltSlot($e_i$)=QltSlot($e_j$) (line 37 and 38). In this case we have that QltSlot($e_k$)>QltSlot($e_i$), hence QltSlot($e_j$)<QltSlot($e_k$) and the invariant is preserved.

Case 3: qlt[QltSlot($e_i$)]=$e_i$ and QltSlot($e_i$)≠QltSlot($e_j$) (line 39 and 40). In this case we have that QltSlot($e_j$)<QltSlot($e_i$) and QltSlot($e_k$)>QltSlot($e_i$). Hence after extracting $e_i$ we have QltSlot($e_j$)<QltSlot($e_k$) and the invariant is preserved.

In conclusion, the invariant is preserved for all possible Insert and Extract operations. In what follows, we prove the computational complexity of various embodiments of the multi-resolution queuing technique.

The cost of the INSERT routine is given by the execution of lines 11 and 12, which, in the worst case, require a linear scan of the qlt table, leading to a cost of O(r), where $r=(p_{max}-p_{min})/p_\Delta$ is the size of the table or number of resolution groups. The performance of this method becomes O(1) when the qlt table is fully utilized, since the while loop in line 11 returns immediately after the first iteration. The rest of the methods (PEEK, EXTRACTMIN and EXTRACT) have a cost of O(1) since they simply require looking up the top element in a doubly-linked list or removing an element from it.

A key observation is that MR-PQ performs best when the number of elements in the table is very large, because then most of the slots in the qlt table will tend to have at least one element and the cost of running the INSERT routine will tend to O(1). This characteristic of MR-PQ queues is beneficial in that it is precisely when the number of elements is very large that one desires to achieve the greatest performance. This is a significant improvement in performance over a conventional priority queue having a computational complexity of O(log(n)), where n is the number of elements in the queue, or even over a bucket queue that has a computational complexity of O(C), where C is the number of buckets.

Customization of Implementations

Different embodiments of a multiresolution priority queue can have different implementations optimized for different use cases, as discussed below.

Sliding Priorities

The base MR-PQ technique assumes that the priorities of the elements in the queue belong to the set $[p_{min}, p_{max})$, where $p_{min}$ and $p_{max}$ are constants. Here, we generalize the base technique to support a more flexible schema by allowing the priority set to slide by following the expression $[p_{min}+\delta(t), p_{max}+\delta(t))$, where $\delta(t)$ is a monotonically increasing function of a parameter t. The case of sliding priority sets is particularly relevant to applications that run on an event-driven computing system. These applications are traditionally implemented using priority queues in which the elements are events to be processed at a future time, and their priority field is the time at which these events need to be triggered. In particular, for these applications we have $\delta(t)=t$, where t is time of execution of the task itself or the time of processing data. Because events with a lower time value need to be processed before those with a higher time value, event-driven computing systems are commonly implemented using min-priority queues.

In order to extend the base MR-PQ technique to support sliding priorities, we make the following observation applicable to event-driven computing systems: if the next event to process has a priority field equal to p* (corresponding to the time at which the event needs to be processed), then it must be that the application's current time is at least p* and therefore we can conclude that no other event will be inserted into the queue with a priority value $p^*-p_\Delta$ or lower. As a result, we can set the sentinel's priority field to $p^*-p_\Delta$ (because the sentinel is never dequeued and never processed), and shift the values of the qlt table so that the first slot points to the priority resolution group of p*. In some embodiments, we implement this shifting feature using a new process called QLTSLIDE, which is passed a parameter prio corresponding to the priority of the last element removed from the queue, which can be p*:

---
QltSlide(prio)

---
44 shift = (prio − queue->prio)/pdelta − 1;
45 if shift < 1:
46   return;
47 for i in [1, qltsize):
48   if i < qltsize − shift:
49     qlt[i] = qlt[i + shift];
50   else
51     qlt[i] = 0;
52 queue->prio = prio − pdelta;

---

Specifically, in line 44 we compute the shift in the priority space that results from extracting a top element with priority prio. In lines 45 and 46, if the shift is less than one slot, there is no need to slide the priority space and the routine returns. (In event-driven computing systems, this corresponds to the case in which time has not advanced enough to shift the qlt table by one or more slots.) Otherwise, we shift the qlt table to the left by shifting the slot pointers, and by padding the last slots with zeros (lines 47 through 51). In line 52, we update the priority of the sentinel to reflect the shift. In event-driven computing systems, this is equivalent to setting the priority of the sentinel to the current system time.

We invoke the function QLTSLIDE every time we extract an element from the top of the queue, which requires us to update the routine EXTRACTMIN as follows:

---
EXTRACTMIN( )

---
53 e = PEEK( );
54 EXTRACT(e);
55 QLTSLIDE(e->prio);   // Added to support sliding priorities
56 return e;

---

To demonstrate the correctness of the MR-PQ algorithm with sliding priorities, it is sufficient to show that the modified EXTRACTMIN routine preserves the MR-PQ invariant (Property 1). Here, the only variant introduced by the new EXTRACTMIN routine includes invoking the QLTSLIDE method in line 55. Notice that by construction, this method removes slots from the left of the qlt table that will no longer be populated (since the priority space has shifted by shift slots) and sets to empty the same amount of slots to the right of the qlt table (since those slots have not been populated yet). The remaining slots are not altered which guarantees the preservation of the MR-PQ invariant.

In another embodiment, rather than actually shifting the pointers (line 49), the sentinel is merely advanced to the slot before the next slot to be processed. Naturally, queue→next would point to the next task to be executed and/or the data element to be processed. In this embodiment, the lowest priority (represented by $p_{max}$) will also increase by $\delta(t)$. But this increase in the priority values does not result in an increase in the total number of slots required because $p_{max}$ has also increased by the same amount $\delta(t)$. Therefore, the look-up table qlt can be implemented as a ring, and the slot where a new element is added and a slot to which the sentinel is to be advanced can be computed as before but by also taking a modulus of those values with the size of the look-up table denoted qltsize. In this embodiment, the look-up table is structured not as a simple array, but as a ring.

Binary Heap Based Multiresolution Priority Queues

In one embodiment, for the case in which not all of the slots in the qlt table are typically filled in, the worst case cost of an MR-PQ can be improved by using a binary search tree to implement the qlt table, instead of a vector as is done in the base implementation. FIG. 2 shows the example presented in FIG. 1A but using a binary tree.

The result of using a binary search tree is that the cost of searching for the next empty slot in lines 11 and 12 of the INSERT operation can be reduced from O(r) to O(log(r)). We will refer to this variant as a binary tree based multiresolution priority queue or BT-MR-PQ.

Multi-Level Buckets

Figure 3:
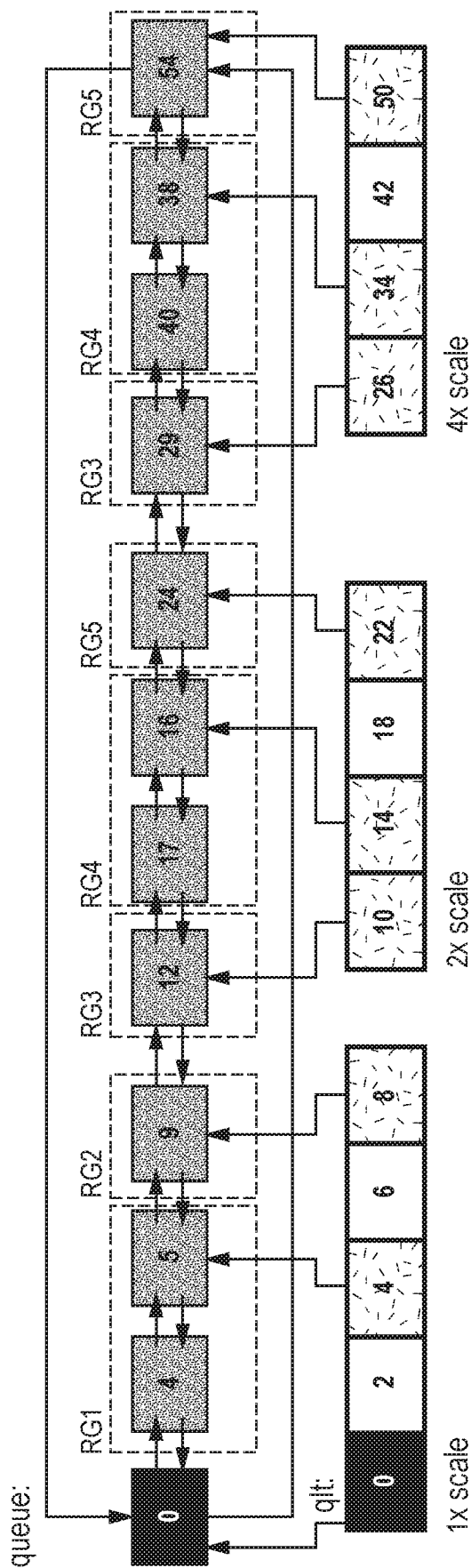
FIG. 3 depicts an embodiment of a multiresolution priority queue having three levels of resolution.

In another embodiment, the qlt table associated to the multiresolution priority queue is organized in different buckets, using in each bucket a different resolution parameter. An illustration of a multi-level bucket implementation is shown in FIG. 3, where the qlt table is organized in three levels:

Level 1 has a resolution $p_A=2$ and covers the priority space from 2 to 9.
Level 2 has a resolution $p_A=4$ and covers the priority space from 10 to 25.
Level 3 has a resolution $p_A=8$ and covers the priority space from 26 to 57.

In this example, a 2× multiplicative factor is used to increase the resolution value from one bucket to the next bucket. Without loss of generality, other values of resolutions, which may or may not be the multiples of a single constant, can be used for each bucket. It should also be understood that the number of buckets, 3, is illustrative only and that the number can be any number such as 2, 4, 7, etc., as long as there are at least two slots in each bucket.

The advantage of using multi-level buckets is to provide finer granularity in those specific regions of the priority space which are deemed more relevant. An example where this strategy can be beneficial is the case of sliding priorities previously described. Under this case, the ExtractMin operation is guaranteed to always remove elements from the first level bucket. This is because the priority space represented by the qlt table in a MR-PQ slides forward as elements are removed, trickling elements from the upper levels down to the lower level. This strategy can yield smaller error since the first level bucket has the finest resolution while still enjoying the high performance properties of the multiresolution priority queue.

Parallelization

Another embodiment of the multi-resolution queuing technique includes a system implementing a multiresolution priority queue whereby any of its operations Insert and Extract (and by construction ExtractMin and Peek) can be issued and executed concurrently by two or more processors. Because the qlt table is implemented as an array, coherent parallel access to the data structure can be achieved by locking only a subset of the entries in the qlt table. In this context, locking means if a particular slot of the look-up table is locked, only one operation (insert or extract) that requires that particular slot can be performed at a time. All other operations requiring that same slot must wait for the operation that is already being performed to complete and to release the lock. As such, operations requiring the same slot are performed sequentially. Operations not requiring the same slots, however, can be initiated and executed concurrently, in parallel. This is in contrast with other priority queue data structures such as heaps which require locking the full data structure.

In general, the fewer the number of slots that need to be locked in order to perform an operation, the greater the degree of parallelism that can be achieved. To this end, in some embodiments, when inserting or extracting an element e from a multiresolution priority queue, only the following slots in the qlt table need to be locked:

slot1=QltSlot(e)
slot2=max {slot such that qlt[slot] !=NULL and slot<slot1}
slot3=min {slot such that qlt[slot] !=NULL and slot>slot1}

A further optimization involves not locking slot3 for the case of inserting an element e when QltSlot(e) is not empty. This optimization exploits the fact that in lines 13-17 of the Insert method elements are added "to the left" of the existing element in the slot. Thus there is no need to lock the slot on the right (slot3).

Yet another optimization involves not locking slot3 for the case of extracting an element e when QltSlot(e) is not empty. This optimization exploits the fact that the only conflict when extracting such element e arises when its next element e'=e→next is also extracted. But extracting e' requires locking QltSlot(e), which ensures the correct serialization of both extract operations.

Another optimization involves not locking slot1 for the case of inserting an element e when QltSlot(e) is empty. This optimization is possible because locking slot2 and slot3 ensures no other element can be inserted or extracted between qlt[slot2] and qlt[slot3], which in turn ensures the correct serialization of the insertion operation.

The following table summarizes only those slots that need to be locked for each operation depending on weather QltSlot(e) is empty or not:

|  | QltSlot(e) is empty | |
| --- | --- | --- |
|  | Insert e | Extract e |
| No | slot1, slot2 | slot1, slot2 |
| Yes | slot2, slot3 | Not applicable |

Figure 4:
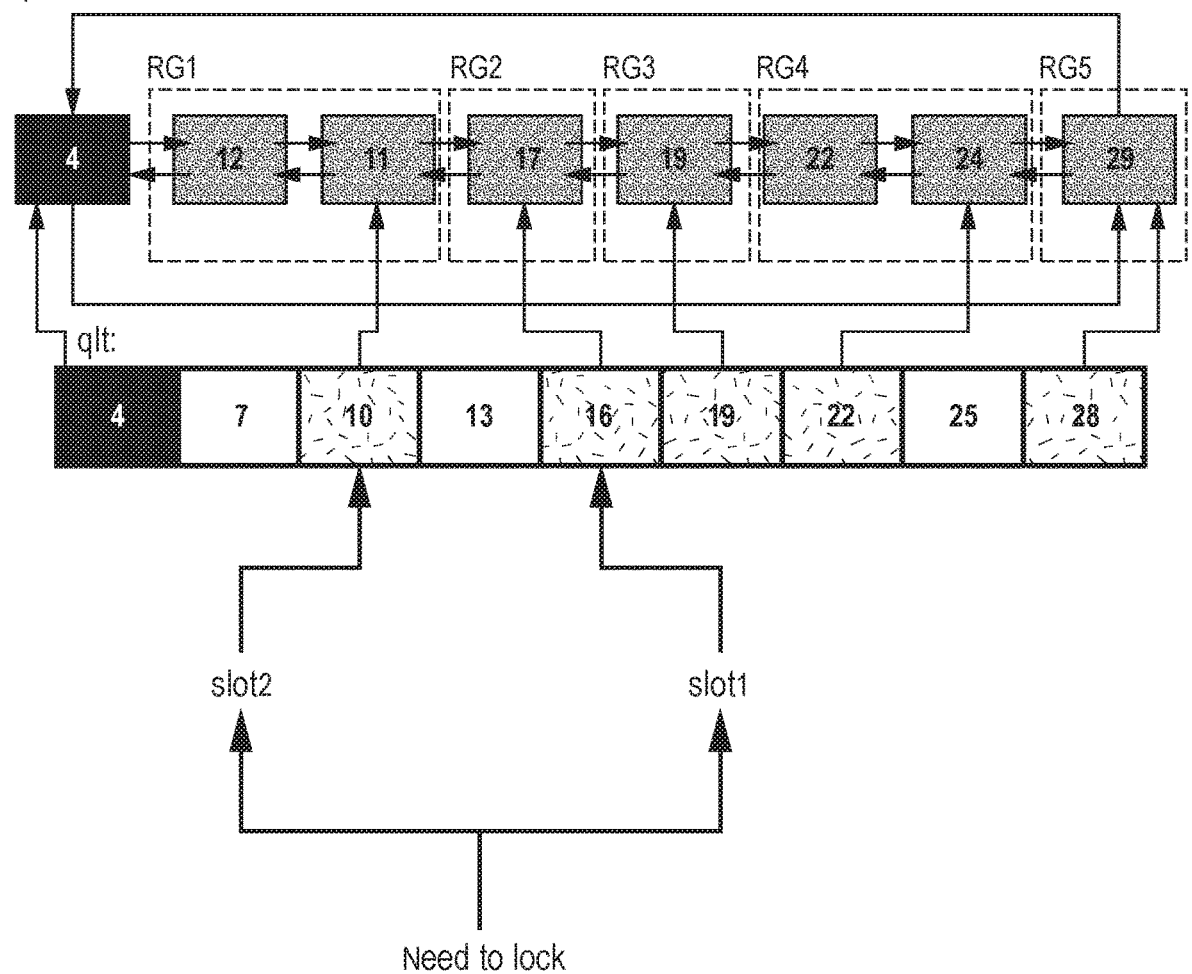
FIG. 4 illustrates concurrent access to an embodiment of a multiresolution priority queue for the case of inserting and/or extracting an element into/from a non-empty slot.
Figures 5, 6:
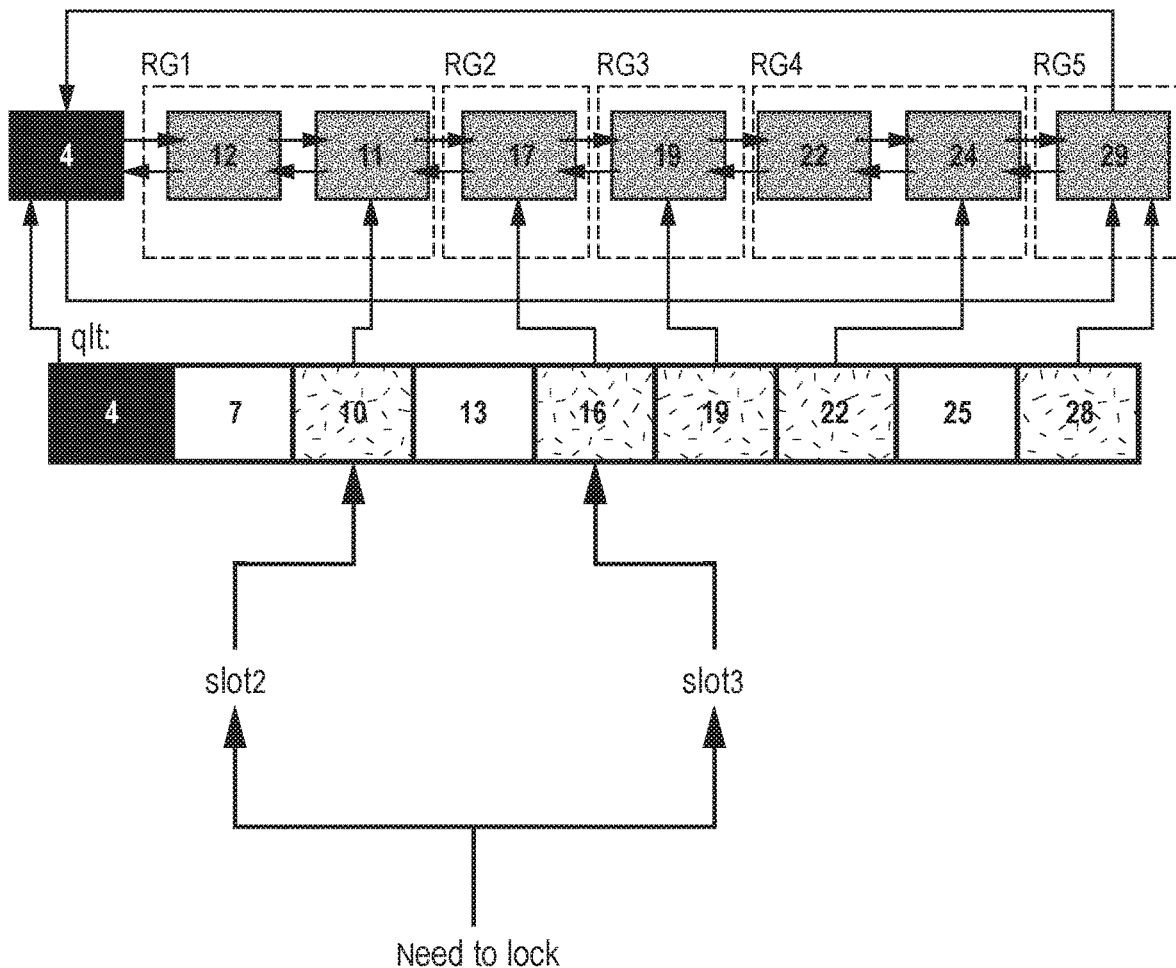
FIG. 5 illustrates concurrent access to an embodiment of a multiresolution priority queue for the case of inserting an element into a slot that is empty.
FIG. 6 is a snapshot of the top resource-consuming functions in an event-driven simulator ordered by their computational cost.

FIG. 4 and FIG. 5 illustrate examples of the slots that need to be locked for the three cases represented in the above table.

EXAMPLES OF APPLICATIONS

Without any loss of generality, we present two practical examples that illustrates the benefits of using a multiresolution priority queue according to one or more of the embodiments described herein. The set of applications and systems that can benefit from various embodiments of a multi-resolution priority queue, i.e., performance of such systems can be improved significantly (e.g., by 2%, 5%, 20% or more) is not limited to the example applications and systems described below.

Application Example 1: Event-Driven Computation

Some embodiments of MR-PQ can be used to speed up the performance of an event-driven computer and/or an event-driven simulator. This type of applications require managing events using a queue of timers. Such class of queues provide their own ExtractMin operation to retrieve the next timer event which has the lower timeout value, i.e., the event that is going to expire first among all the events in the queue. A traditional way to implement such queue is by using a priority queue data structure such as a binary heap. While binary heaps and similar data structures provide an efficient implementation of priority queues, empirical experimentation demonstrates that they can become a system bottleneck when the number of events in the queue is very high, e.g., more than 50, 100, 200, 1,000, 5,000, etc. This is shown in FIG. 6, which displays the top functions in an event-driven simulator ordered by their computational cost, with the call to ExtractMin ranked as the most expensive function. This is explained by the fact that a binary heap implementation typically provides infinite resolution timers, which leads to a significant processing overhead. Multiresolution priority queues allow applications to tune the priority resolution of the implementation to match the necessary requirements (no more and no less) of the application to achieve better performance. FIG. 7 presents various performance metrics resulting from benchmarking an implementation of the priority queue in the event-driven simulator based on binary heaps versus another implementation based on MR-PQ. As shown, MR-PQ improves performance in all the metrics achieving: (1) lower CPU cache miss ratios, (2) higher CPU instructions per cycle, (3) lower system packet drops, and (4) higher events generated per second.

Application Example 2: Graph-Based Computations

Some embodiments of MR-PQ can also be used to speed up the computation of certain graph-based procedures. As an example, consider the problem of finding the shortest path between two nodes in a network using Dijkstra's algorithm. The shortest path problem has several inherent properties that make it suitable for using multiresolution priority queues. A main reason for using a multiresolution priority queue versus other well-known priority queues such as binary heaps or Fibonacci Heaps i as follows. Traditional priority queues support priorities belonging to a total order set. For instance, the set of positive real numbers in the priority queue used by the standard Dijkstra algorithm or the set of positive integers used in Dial's algorithm. However, no practical problem usually needs the capability to order the full set of feasible elements. Shortest path problems found in the real world only need to deal with a much reduced subset of the priority space. A multiresolution priority queue is capable of exploiting this property by fitting its resolution into the problem's own natural resolution, leading to a lower computational complexity, and either producing no error or producing a bounded error that can be made arbitrarily small.

More formally, to resolve a graph with v vertices and e edges, Dijkstra's algorithm requires v Insert operations, v ExtractMin, and e ExtractMin and Insert operations. Since in a priority queue implemented as a binary heap the cost of Insert and ExtractMin is $O(\log(v))$, the resulting cost of executing Dijkstra's algorithm is $O((v+e)\log(v))$. This bound can be reduced to $O(e+v \log(v))$ if we use a Fibonacci heap, but the same general argument applies. If instead we use a multiresolution priority queue, the cost becomes $O((v+e)\log(r))$, where r is the number of resolutions in the space of edge weights. Hence, for graph problems in which r is much smaller than v, BT-MR-PQ provides a lower computational cost. Furthermore, if v is very large, the MR-PQ base implementation can lead to an amortized cost of the Insert operation of $O(1)$, making the amortized cost of Dijkstra's algorithm $O(v+e)$.

Figure 8:
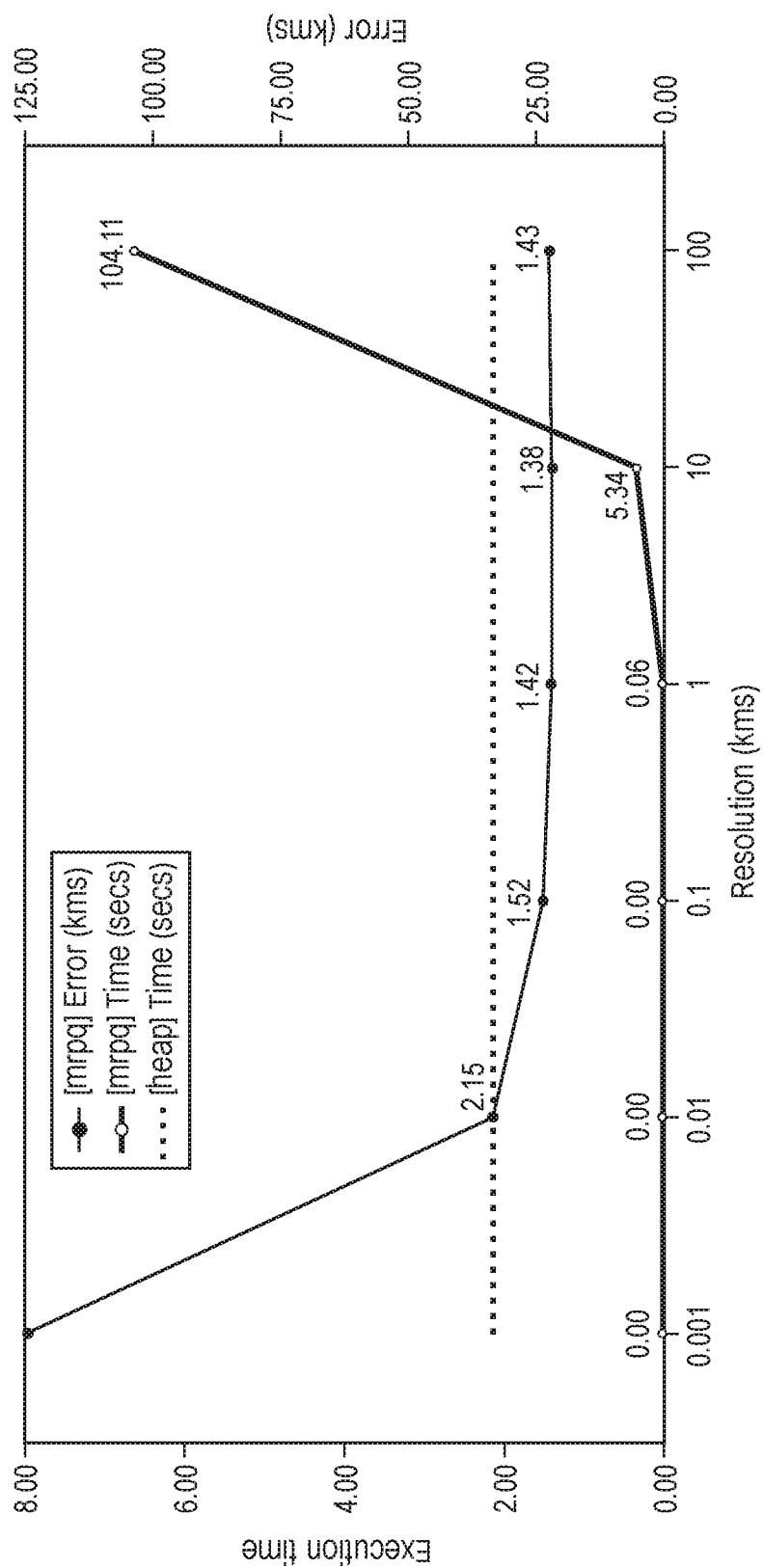
FIG. 8 shows a reduction of computation time to find the shortest path from San Francisco to Boston by using an embodiment of a multiresolution a priority queue.
Figure 9:
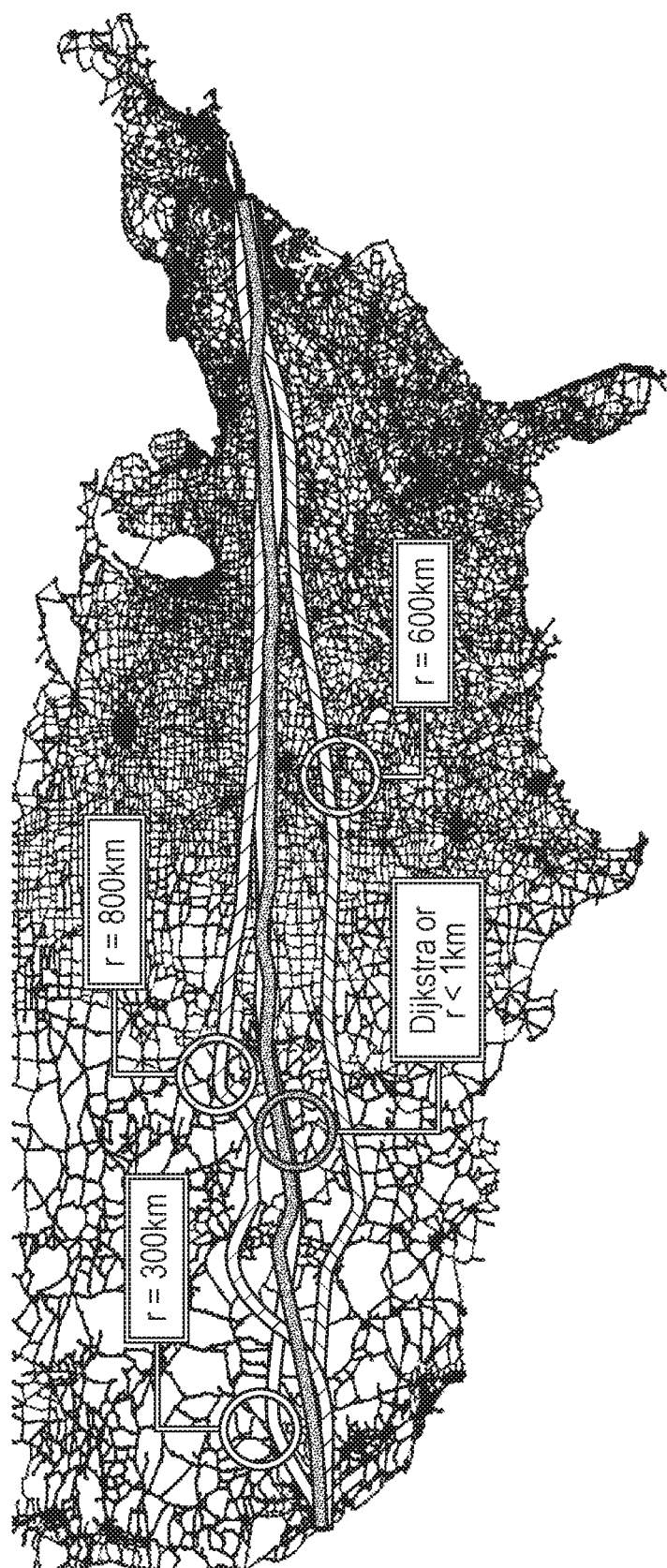
FIG. 9 shows various shortest paths from San Francisco to New York using different embodiments of multiresolution priority queues, where higher resolutions give higher performance at the expense of introducing a bounded error.

FIG. 8 shows the value of using a multiresolution priority queue to compute the shortest physical path between San Francisco and Boston on the USA road network in comparison with a binary heap implementation. As shown, for resolutions higher than 0.1 kms, the performance of the MR-PQ implementation is superior (has lower execution time) to the binary heap implementation. Notice also that FIG. 8 shows that for resolutions below 1 km, no error is introduced by the MR-PQ implementation. Hence, by operating the MR-PQ with a resolution between 0.1 and 1 km, we can achieve faster performance than the binary heap without introducing any additional error. FIG. 9 shows the resulting shortest paths from San Francisco to New York as the resolution parameter r in the priority queue is increased for the values of r<1 km (red line), r=300 km (blue line), r=500 km (green light) and r=800 km (orange line). The red line shows the shortest path with zero error. As shown, as the resolution parameter increases, so does the error in comparison to the shortest path, but the performance improves, as well.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. Sets and subsets, in general, include one or more members.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

What is claimed is:

1. A method for queuing elements for processing thereof according to element priorities, the method comprising the steps of:
   (a) in a plurality of priority groups, wherein at least one priority group corresponds to a plurality of distinct priorities, determining a first priority group corresponding to a first new element that is to be queued;
   (b) determining a first slot in a contiguous look-up table comprising a plurality of slots, at least one slot comprising a queue pointer, the first slot corresponding to the first priority group;
   (c) when the first slot is not empty:
      (1) selecting a first queued element corresponding to the first slot; and
      (2) queuing in a queue the first new element immediately before the first queued element, by storing immediately before the first slot a pointer to a memory location in the queue of the first new element, maintaining contiguity of the look-up table;
   (d) when the first slot is empty:
      (1) selecting from a first set of slots that are in the look-up table and that are associated with a set of priority groups each having a priority higher than the priority group corresponding to the first new element, a second slot that is not empty and that is associated with a lowest priority group in the first set of slots;
      (2) selecting a second queued element corresponding to the second slot;
      (3) queuing in the queue the first new element immediately after the second queued element, maintaining contiguity of the look-up table; and
      (4) storing in the first slot a pointer to a memory location in the queue of the first new element.

2. The method of claim 1, wherein:
   the plurality of slots is configured as an array or a binary tree;
   each slot corresponds to a respective priority group; and
   each non-empty slot holds a respective pointer to a respective element in the queue, the respective element having a priority belonging to the respective priority group.

3. The method of claim 1, wherein the plurality of slots is associated with a highest global priority, the method further comprising:
   decreasing the highest global priority;
   determining a number of slots to be shifted by identifying one or more slots each of which has a priority associated therewith that is higher than the decreased highest global priority; and
   if an index k of a candidate slot is less than a difference between a total number of slots in the look-up table and the number of slots to be shifted, storing in the candidate slot having the index k a pointer stored in another slot having an index k+ the number of slots to be shifted;
   otherwise, storing in the candidate slot having the index k a NULL pointer.

4. The method of claim 3, wherein decreasing the highest global priority comprises increasing a value indicative of priority.

5. The method of claim 3, wherein decreasing the highest global priority comprises decreasing a value indicative of priority.

6. The method of claim 1, wherein:
   the look-up table is configured as a ring structure; and
   determining the first slot in the look-up table comprises computing a modulus using a slot size of the look-up table.

7. The method of claim 6, wherein the plurality of slots is associated with a highest global priority, the method further comprising:
   decreasing the highest global priority;
   determining a number of slots to be shifted by identifying one or more slots each of which has a priority associated therewith that is higher than the decreased highest global priority; and
   incrementing a sentinel, that indicates an element associated with the highest global priority, to a slot location obtained by:
      adding the number of slots to a current slot location of the sentinel; and
      obtaining a modulus of the addition using the slot size of the look-up table.

8. The method of claim 1, wherein:
   the look-up table comprises a plurality of slot sets, comprising a first slot set and a second slot set;
   a first resolution is associated with the first slot set, the first resolution comprising a ratio of: (a) a difference between highest and lowest priorities associated with the first slot set and (b) a number of slots in the first slot set; and
   a second resolution is associated with the second slot set, the second resolution comprising a ratio of: (a) a difference between highest and lowest priorities associated with the second slot set and (b) a number of slots in the second slot set, the second resolution being different from the first resolution.

9. The method of claim 1, further comprising determining a lockset associated with a specified element by:
   determining a priority group corresponding to the specified element;
   determining a first candidate lock slot in the look-up table, the first candidate lock slot corresponding to the priority group corresponding to the specified element;
   selecting from a first candidate set of slots that are in the look-up table and that are associated with a set of priority groups each having a priority higher than the priority group corresponding to the specified element, a second candidate lock slot that is not empty and that is associated with a lowest priority in the first candidate set of slots;
   locking the second candidate lock slot;
   if the first candidate lock slot is not empty:
      locking the first candidate lock slot;
   otherwise:
      selecting from a second candidate set of slots in the look-up table that are associated with a set of priority groups each having a priority lower than the priority group corresponding to the specified element, a third candidate lock slot that is not empty and that is associated with a highest priority group in the second candidate set of slots; and
      locking the third candidate slot.

10. The method of claim 9, further comprising:
   determining a first lockset of slots in the look-up table that are to be locked and correspond to the first new element that is to be queued, by setting the first new element as the specified element;
   determining a second lockset of slots in the look-up table that are to be locked and correspond to a second new element that is to be queued, by setting the second new element as the specified element; and concurrently initiating one or more of steps (c)(1)-(2) or (d)(2)-(4) for both the first and second new elements when the first and second locksets do not overlap.

11. The method of claim 9, further comprising:
determining a first lockset of slots in the look-up table that are to be locked and correspond to the first new element that is to be queued, by setting the first new element as the specified element;
determining a second lockset of slots in the look-up table that are to be locked and correspond to an element to be extracted, by setting the element to be extracted as the specified element; and
concurrently initiating extraction of the element to be extracted and one or more of steps (c)(1)-(2) or (d)(2)-(4) for the first new element when the first and second locksets do not overlap.

12. The method of claim 9, further comprising:
determining a first lockset of slots in the look-up table that are to be locked and correspond to a first element to be extracted, by setting the first element to be extracted as the specified element;
determining a second lockset of slots in the look-up table that are to be locked and correspond to a second element to be extracted, by setting the second element to be extracted as the specified element; and
concurrently initiating extraction of the first and second elements to be extracted when the first and second locksets do not overlap.

13. The method of claim 1, further comprising extracting a specified element that is to be extracted by:
(e) determining a priority group corresponding to the specified element;
(f) determining an extraction slot in the look-up table that corresponds to the priority group corresponding to the specified element;
(g) determining that the extraction slot contains a pointer to the specified element; and
(h) if a previous element associated with the specified element belongs to the priority group corresponding to the specified element, storing in the extraction slot a pointer to a memory location in the queue of the previous element and otherwise storing in the extraction slot a NULL pointer.

14. The method of claim 13, further comprising setting a next element of a sentinel element in the queue as the specified element that is to be extracted.

15. The method of claim 1, further comprising:
extracting at least one element from the queue, the element comprising a task to be executed or a data element to be processed, for execution or processing of the extracted element by a specialized computer selected from the group consisting of: a parallel computer comprising a plurality of processors, a distributed computer, and an event-driven computer.

16. A system for queuing elements for processing thereof according to element priorities, the system comprising:
a first processor; and
a first memory in electrical communication with the first processor, the first memory comprising instructions which, when executed by a processing unit comprising at least one of the first processor and a second processor, and in electronic communication with a memory module comprising at least one of the first memory and a second memory, program the processing unit to:
(a) in a plurality of priority groups, wherein at least one priority group corresponds to a plurality of distinct priorities, determine a first priority group corresponding to a first new element that is to be queued;
(b) determine a first slot in a contiguous look-up table comprising a plurality of slots, at least one slot comprising a queue pointer, the first slot corresponding to the first priority group;
(c) when the first slot is not empty:
(1) select a first queued element corresponding to the first slot; and
(2) queue in a queue the first new element immediately before the first queued element, by storing immediately before the first slot a pointer to a memory location in the queue of the first new element, to maintain contiguity of the look-up table;
(d) when the first is empty:
(1) select from a first set of slots that are in the look-up table and that are associated with a set of priority groups each having a priority higher than the priority group corresponding to the first new element, a second slot that is not empty and that is associated with a lowest priority group in the first set of slots;
(2) select a second queued element corresponding to the second slot;
(3) queue in the queue the first new element immediately after the second queued element, to maintain contiguity of the look-up table; and
(4) store in the first slot a pointer to a memory location in the queue of the first new element.

17. The system of claim 16, wherein:
the plurality of slots is configured as an array or a binary tree;
each slot corresponds to a respective priority group; and
each non-empty slot holds a respective pointer to a respective element in the queue, the respective element having a priority belonging to the respective priority group.

18. The system of claim 16, wherein the plurality of slots is associated with a highest global priority, and the instructions further program the processing unit to:
decrease the highest global priority;
determine a number of slots to be shifted by identifying one or more slots each of which has a priority associated therewith that is higher than the decreased highest global priority; and
if an index k of a candidate slot is less than a difference between a total number of slots in the look-up table and the number of slots to be shifted, store in the candidate slot having the index k a pointer stored in another slot having an index k+ the number of slots to be shifted;
otherwise, store in the candidate slot having the index k a NULL pointer.

19. The system of claim 18, wherein to decrease the highest global priority, the instructions program the processing unit to increase a value indicative of priority.

20. The system of claim 18, wherein to decrease the highest global priority, the instructions program the processing unit to decrease a value indicative of priority.

21. The system of claim 16, wherein:
the look-up table is configured as a ring structure; and
to determine the first slot in the look-up table, the instructions program the processing unit to compute a modulus using a slot size of the look-up table.

22. The system of claim 21, wherein the plurality of slots is associated with a highest global priority, and the instructions further program the processing unit to:

decrease the highest global priority;
determine a number of slots to be shifted by identifying one or more slots each of which has a priority associated therewith that is higher than the decreased highest global priority; and
increment a sentinel, that indicates an element associated with the highest global priority, to a slot location obtained by:
adding the number of slots to a current slot location of the sentinel; and
obtaining a modulus of the addition using the slot size of the look-up table.

23. The system of claim 16, wherein:
the look-up table comprises a plurality of slot sets, comprising a first slot set and a second slot set;
a first resolution is associated with the first slot set, the first resolution comprising a ratio of: (a) a difference between highest and lowest priorities associated with the first slot set and (b) a number of slots in the first slot set; and
a second resolution is associated with the second slot set, the second resolution comprising a ratio of: (a) a difference between highest and lowest priorities associated with the second slot set and (b) a number of slots in the second slot set, the second resolution being different from the first resolution.

24. The system of claim 16, wherein the instructions further program the processing unit to determine a lockset associated with a specified element and, to determine the lockset, the instructions program the processing unit to:
determine a priority group corresponding to the specified element;
determine a first candidate lock slot in the look-up table, the first candidate lock slot corresponding to the priority group corresponding to the specified element;
select from a first candidate set of slots that are in the look-up table and that are associated with a set of priority groups each having a priority higher than the priority group corresponding to the specified element, a second candidate lock slot that is not empty and that is associated with a lowest priority in the first candidate set of slots;
lock the second candidate lock slot;
if the first candidate lock slot is not empty:
lock the first candidate lock slot;
otherwise:
select from a second candidate set of slots in the look-up table that are associated with a set of priority groups each having a priority lower than the priority group corresponding to the specified element, a third candidate lock slot that is not empty and that is associated with a highest priority group in the second candidate set of slots; and
lock the third candidate slot.

25. The system of claim 24, wherein the instructions further program the processing unit to:
determine a first lockset of slots in the look-up table that are to be locked and correspond to the first new element that is to be queued, by setting the first new element as the specified element;
determine a second lockset of slots in the look-up table that are to be locked and correspond to a second new element that is to be queued, by setting the second new element as the specified element; and
concurrently initiate one or more of operations (c)(1)-(2) or (d)(2)-(4) for both the first and second new elements when the first and second locksets do not overlap.

26. The system of claim 24, wherein the instructions further program the processing unit to:
determine a first lockset of slots in the look-up table that are to be locked and correspond to the first new element that is to be queued, by setting the first new element as the specified element;
determine a second lockset of slots in the look-up table that are to be locked and correspond to an element to be extracted, by setting the element to be extracted as the specified element; and
concurrently initiate extraction of the element to be extracted and one or more of operations (c)(1)-(2) or (d)(2)-(4) for the first new element when the first and second locksets do not overlap.

27. The system of claim 24, wherein the instructions further program the processing unit to:
determine a first lockset of slots in the look-up table that are to be locked and correspond to a first element to be extracted, by setting the first element to be extracted as the specified element;
determine a second lockset of slots in the look-up table that are to be locked and correspond to a second element to be extracted, by setting the second element to be extracted as the specified element; and
concurrently initiate extraction of the first and second elements to be extracted when the first and second locksets do not overlap.

28. The system of claim 16, wherein the instructions further program the processing unit to extract a specified element that is to be extracted and, to extract the specified element, the instructions program the processing unit to:
(e) determine a priority group corresponding to the specified element;
(f) determine an extraction slot in the look-up table that corresponds to the priority group corresponding to the specified element;
(g) determine that the extraction slot contains a pointer to the specified element; and
(h) if a previous element associated with the specified element belongs to the priority group corresponding to the specified element, store in the extraction slot a pointer to a memory location in the queue of the previous element and otherwise store in the extraction slot a NULL pointer.

29. The system of claim 28, wherein the instructions further program the processing unit to: set a next element of a sentinel element in the queue as the specified element that is to be extracted.

30. The system of claim 16, wherein the instructions further program the processing unit to:
extract at least one element from the queue, the element comprising a task to be executed or a data element to be processed, for execution or processing of the extracted element by a specialized computer selected from the group consisting of: a parallel computer comprising a plurality of processors, a distributed computer, and an event-driven computer.

* * * * *

UNITED STATES PATENT AND TRADEMARK OFFICE
CERTIFICATE OF CORRECTION

| | |
|---|---|
| PATENT NO. | : 11,106,493 B2 |
| APPLICATION NO. | : 15/993036 |
| DATED | : August 31, 2021 |
| INVENTOR(S) | : Jordi Ros-Giralt |

It is certified that error appears in the above-identified patent and that said Letters Patent is hereby corrected as shown below:

In the Specification

At Column 1, Line 13, insert:
-- STATEMENT OF GOVERNMENT SUPPORT
This invention was made with government support under Award No. DE-SC0017184 awarded by the U.S. Department of Energy. The government has certain rights in the invention. --

Signed and Sealed this
Twenty-eighth Day of June, 2022

Katherine Kelly Vidal
*Director of the United States Patent and Trademark Office*